(12) United States Patent
Loeb et al.

(10) Patent No.: US 7,961,612 B2
(45) Date of Patent: Jun. 14, 2011

(54) LIMITING TRANSMISSION RATE OF DATA

(75) Inventors: Mitchell L. Loeb, Durham, NC (US);
Harry Cheselka, Raleigh, NC (US);
William G. Holland, Cary, NC (US);
Norman C. Strole, Raleigh, NC (US);
Edward S. Suffern, Chapel Hill, NC (US)

(73) Assignee: International Business Machines Corporation, Armonk, NY (US)

( * ) Notice: Subject to any disclaimer, the term of this patent is extended or adjusted under 35 U.S.C. 154(b) by 811 days.

(21) Appl. No.: 11/566,338

(22) Filed: Dec. 4, 2006

(65) Prior Publication Data

US 2008/0130669 A1  Jun. 5, 2008

(51) Int. Cl.
*G01R 31/08* (2006.01)
(52) U.S. Cl. .................... 370/230.1; 370/235
(58) Field of Classification Search .......... None
See application file for complete search history.

(56) References Cited

U.S. PATENT DOCUMENTS

| | | | |
|---|---|---|---|
| 6,295,285 B1 | 9/2001 | Whitehead | |
| 6,499,069 B1* | 12/2002 | Shimura ................... | 710/62 |
| 6,907,001 B1* | 6/2005 | Nakayama et al. ........... | 370/230 |
| 7,024,202 B2* | 4/2006 | Besset-Bathias et al. . | 455/452.2 |
| 7,145,869 B1* | 12/2006 | Kadambi et al. ............ | 370/229 |
| 7,505,408 B1* | 3/2009 | Mohaban et al. ............. | 370/235 |
| 2002/0097677 A1 | 7/2002 | Hoar et al. | |
| 2003/0138253 A1 | 7/2003 | Kim et al. | |
| 2004/0042460 A1 | 3/2004 | Gruhl et al. | |
| 2004/0062259 A1* | 4/2004 | Jeffries et al. ................. | 370/412 |
| 2004/0085964 A1* | 5/2004 | Vaananen .................. | 370/395.4 |
| 2004/0213257 A1 | 10/2004 | Abdelilah et al. | |
| 2004/0252697 A1 | 12/2004 | Wille et al. | |
| 2005/0047345 A1 | 3/2005 | Suh | |
| 2005/0068798 A1 | 3/2005 | Lee et al. | |
| 2005/0276220 A1* | 12/2005 | Kokko ......................... | 370/230 |
| 2006/0140128 A1* | 6/2006 | Chi et al. ..................... | 370/241 |
| 2006/0154679 A1* | 7/2006 | Chang ........................ | 455/502 |
| 2006/0187836 A1* | 8/2006 | Frey et al. ................... | 370/235 |
| 2007/0047456 A1* | 3/2007 | Jorgensen et al. ........... | 370/250 |
| 2007/0061433 A1* | 3/2007 | Reynolds et al. ............ | 709/223 |
| 2007/0153803 A1* | 7/2007 | Lakshmanamurthy et al. ........................ | 370/395.43 |
| 2007/0268903 A1* | 11/2007 | Nakagawa ................... | 370/392 |

* cited by examiner

*Primary Examiner* — Pankaj Kumar
*Assistant Examiner* — Eunsook Choi
(74) *Attorney, Agent, or Firm* — Cynthia Seal; Hoffman Warnick LLC

(57) ABSTRACT

An improved solution for limiting the transmission rate of data over a network is provided according to an aspect of the invention. In particular, the transmission rate for a port is limited by rate limiting one of a plurality of queues (e.g., class/quality of service queues) for the port, and directing all data (e.g., packets) for transmission through the port to the single rate limited queue. In this manner, the transmission rate for the port can be effectively limited to accommodate, for example, a lower transmission rate for a port on a destination node.

17 Claims, 3 Drawing Sheets

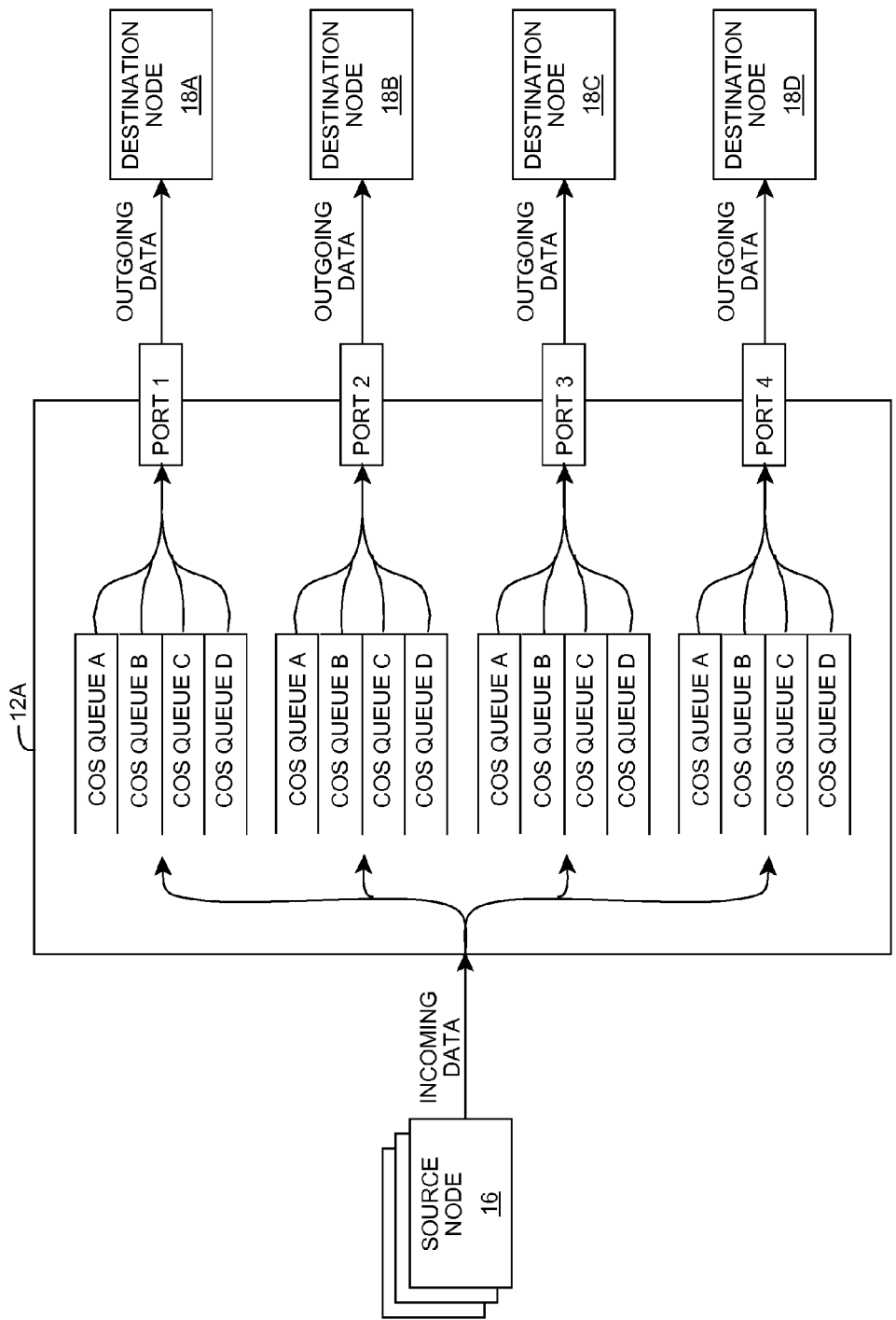

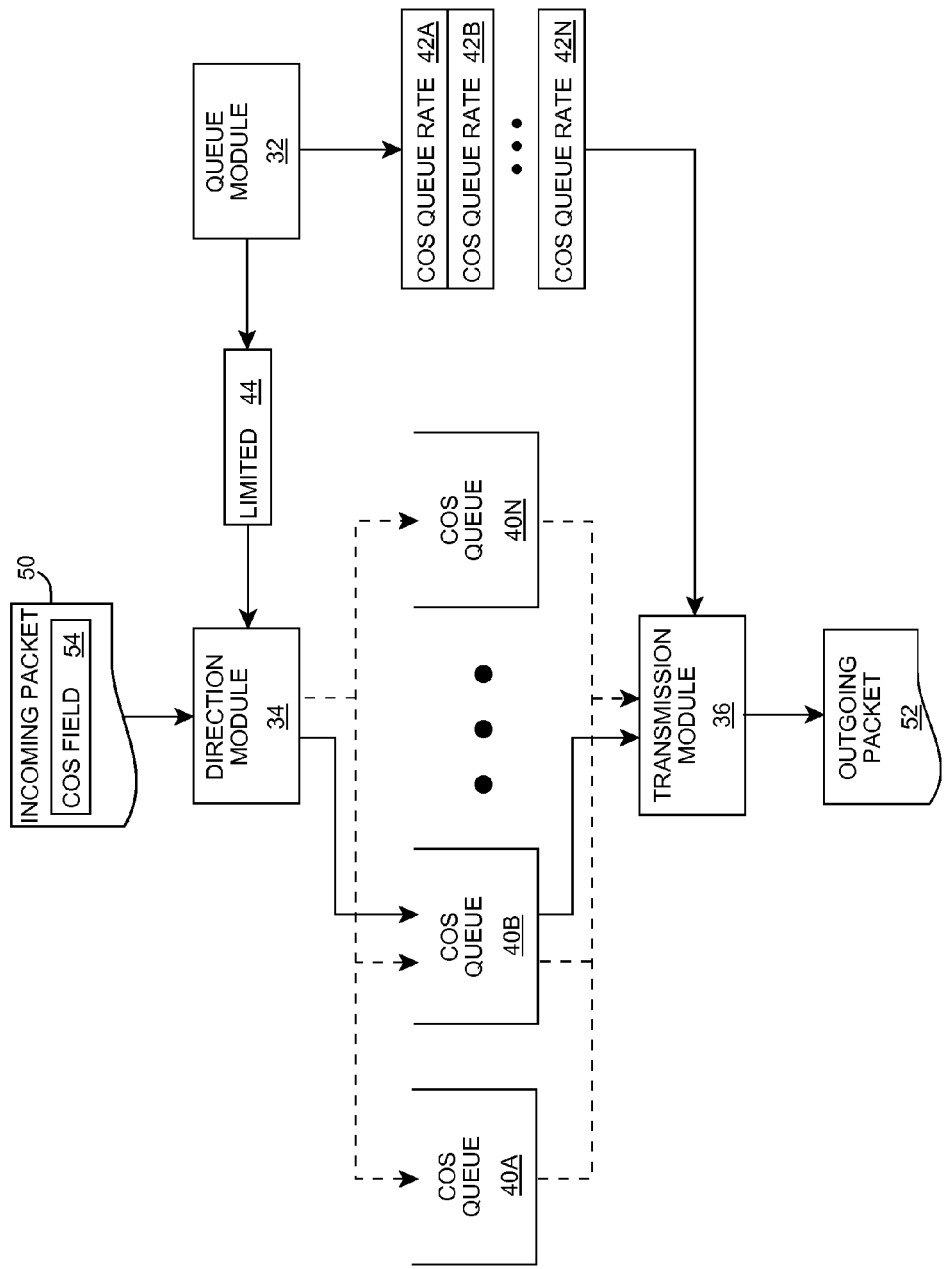

LIMITING TRANSMISSION RATE OF DATA

FIELD OF THE INVENTION

Aspects of the invention relate generally to transmitting data over a network, and more particularly, to a solution for limiting the transmission rate of a port, e.g., to avoid overloading a downstream port having a lower transmission rate.

BACKGROUND OF THE INVENTION

In modern networks, data, such as packetized data, is frequently routed between several network nodes during transmission. Typically, each network node includes one or more ports over which data is transmitted and received. Each port has a maximum transmission rate at which it can process data (e.g., packets).

A problem occurs when two network nodes have different transmission rates. For example, a first network node may be capable of transmitting data at a rate of 1 Gigabits/second (Gbs), however a destination network node may only be capable of processing data at a rate of 100 Megabits/second (Mbs). In this case, the destination network node can be overrun with data, particularly broadcast and/or multicast data. This results in packets being lost, and therefore not processed, at the destination network node. Additionally, the lost packets may result in a lower throughput for the network due to additional traffic from retry request(s) for and/or retransmission(s) of required data packets before they are successfully processed by the destination network node.

An approach to addressing this problem is the use of a flow control mechanism. In this case, the receiving node can notify the transmitting node to slow down the data transmission in a response. However, this approach results in a relatively long recovery time since the lost packets occur further along a network path. Additionally, some data, such as broadcast and multicast data, do not generate a response. As a result, there is no way for the receiving node to control the rate or retries of this type of data. Other approaches suggest inserting and removing symbols in the data stream at both ends of the transmission. However, this requires all nodes on a network to support such an approach.

In view of the foregoing, a need exists to overcome one or more of the deficiencies in the related art.

BRIEF SUMMARY OF THE INVENTION

Aspects of the invention provide an improved solution for limiting the transmission rate of data over a network. In particular, the transmission rate for a port is limited by rate limiting one of a plurality of queues (e.g., class/quality of service queues) for the port, and directing all data (e.g., packets) for transmission through the port to the single rate limited queue. In this manner, the transmission rate for the port can be effectively limited to accommodate, for example, a lower transmission rate for a port on a destination node.

A first aspect of the invention provides a method of transmitting data over a network, the method comprising: limiting a transmission rate for one of a plurality of queues for a port; and directing all data for transmission through the port to the one of the plurality of queues.

A second aspect of the invention provides a system for transmitting data over a network, the system comprising: a communications port; a system for limiting a transmission rate for one of a plurality of queues for the port; and a system for directing all data for transmission through the port to the one of the plurality of queues.

A third aspect of the invention provides a computer program comprising program code stored on a computer-readable medium, which when executed, enables a computer system to implement a method of transmitting data over a network, the method comprising: limiting a transmission rate for one of a plurality of queues for a port; and directing all data for transmission through the port to the one of the plurality of queues.

A fourth aspect of the invention provides a method of generating a system for transmitting data over a network, the method comprising: providing a computer system operable to: limit a transmission rate for one of a plurality of queues for a port; and direct all data for transmission through the port to the one of the plurality of queues.

A fifth aspect of the invention provides a business method for transmitting data over a network, the business method comprising managing a computer system that performs the process described herein; and receiving payment based on the managing.

The illustrative aspects of the invention are designed to solve one or more of the problems herein described and/or one or more other problems not discussed.

BRIEF DESCRIPTION OF THE SEVERAL VIEWS OF THE DRAWINGS

These and other features of the invention will be more readily understood from the following detailed description of the various aspects of the invention taken in conjunction with the accompanying drawings that depict various embodiments of the invention, in which:

FIG. 2 shows an illustrative switch according to an embodiment of the invention.

FIG. 3 shows an illustrative data flow diagram for transmitting data over a network using the computer system of FIG. 1 according to an embodiment of the invention.

It is noted that the drawings are not to scale. The drawings are intended to depict only typical aspects of the invention, and therefore should not be considered as limiting the scope of the invention. In the drawings, like numbering represents like elements between the drawings.

DETAILED DESCRIPTION OF THE INVENTION

Figure 1:
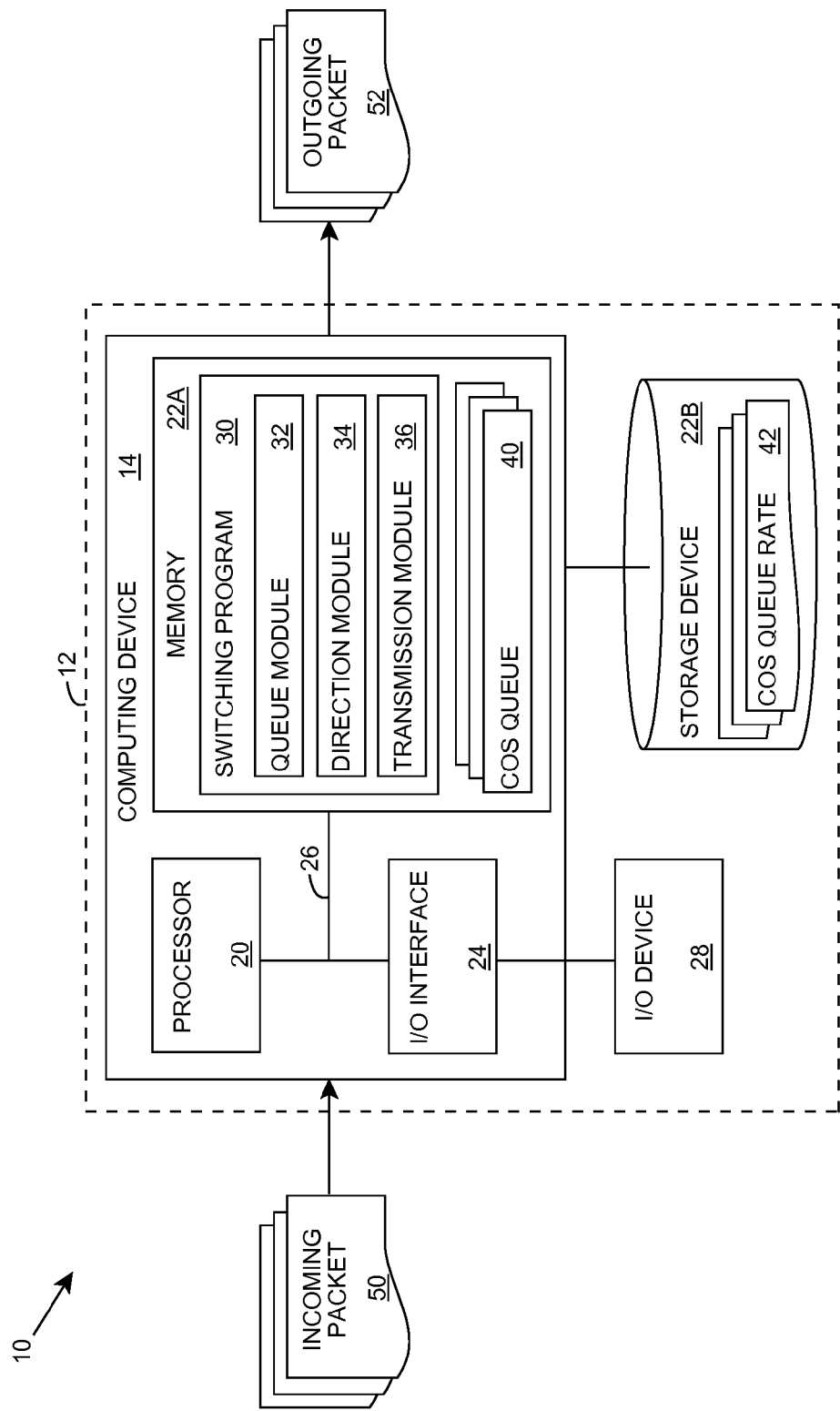
FIG. 1 shows an illustrative environment for transmitting data over a network according to an embodiment of the invention.

As indicated above, aspects of the invention provide an improved solution for limiting the transmission rate of data over a network. In particular, the transmission rate for a port is limited by rate limiting one of a plurality of queues (e.g., class/quality of service queues) for the port, and directing all data (e.g., packets) for transmission through the port to the single rate limited queue. In this manner, the transmission rate for the port can be effectively limited to accommodate, for example, a lower transmission rate for a port on a destination node. As used herein, unless otherwise noted, the term "set" means one or more (i.e., at least one) and the phrase "any solution" means any now known or later developed solution.

Turning to the drawings, FIG. 1 shows an illustrative environment 10 for transmitting data, such as incoming packets 50 and outgoing packets 52, over a network according to an embodiment of the invention. To this extent, environment 10 includes a computer system 12 that can perform the process described herein in order to transmit data over a network. In particular, computer system 12 is shown including a computing device 14 that comprises a switching program 30, which makes computing device 14 operable to transmit data over a network by performing the process described herein.

Computing device 14 is shown including a processor 20, a memory 22A, an input/output (I/O) interface 24, and a bus 26. Further, computing device 14 is shown in communication with an external I/O device/resource 28 and a storage device 22B. In general, processor 20 executes program code, such as switching program 30, which is stored in a storage system, such as memory 22A and/or storage device 22B. While executing program code, processor 20 can read and/or write data, such as class of service (COS) queue rate(s) 42, to/from memory 22A, storage device 22B, and/or I/O interface 24. Bus 26 provides a communications link between each of the components in computing device 14. I/O device 28 can comprise any device that transfers information between a user and computing device 14. To this extent, I/O device 28 can comprise a user I/O device to enable an individual user to interact with computing device 14 and/or a communications device to enable a system user to communicate with computing device 14 using any type of communications link.

In any event, computing device 14 can comprise any general purpose computing article of manufacture capable of executing program code installed thereon. However, it is understood that computing device 14 and switching program 30 are only representative of various possible equivalent computing devices that may perform the process described herein. To this extent, in other embodiments, the functionality provided by computing device 14 and switching program 30 can be implemented by a computing article of manufacture that includes any combination of general and/or specific purpose hardware and/or program code. In each embodiment, the program code and hardware can be created using standard programming and engineering techniques, respectively.

Similarly, computer system 12 is only illustrative of various types of computer systems for implementing aspects of the invention. For example, in one embodiment, computer system 12 comprises two or more computing devices that communicate over any type of communications link, such as a network, a shared memory, or the like, to perform the process described herein. Further, while performing the process described herein, one or more computing devices in computer system 12 can communicate with one or more other computing devices external to computer system 12 using any type of communications link. In either case, the communications link can comprise any combination of various types of wired and/or wireless links; comprise any combination of one or more types of networks; and/or utilize any combination of various types of transmission techniques and protocols.

As discussed herein, switching program 30 enables computer system 12 to transmit data over a network. To this extent, switching program 30 is shown including a queue module 32, a direction module 34, and a transmission module 36. Operation of each of these modules is discussed further herein. However, it is understood that some of the various modules shown in FIG. 1 can be implemented independently, combined, and/or stored in memory of one or more separate computing devices that are included in computer system 12. Further, it is understood that some of the modules and/or functionality may not be implemented, or additional modules and/or functionality may be included as part of computer system 12.

Regardless, aspects of the invention provide a solution for transmitting data over a network. To this extent, computer system 12 can comprise a node on a network. In an embodiment of the invention, computer system 12 comprises a switch, such as an Ethernet switch, that receives incoming data (e.g., incoming packets 50) and directs/routes it as outgoing data (e.g., outgoing packets 52) over a network. However, it is understood that aspects of the invention can be incorporated into any type of network node, including for example, a general purpose computing device, a router, a firewall, a server, and/or the like.

FIG. 2 shows an illustrative switch 12A according to an embodiment of the invention. In general, switch 12A can receive incoming data from a set of source nodes 16 and route the data to a port 1-4 where it is transmitted over the network as outgoing data for processing by a corresponding destination node 18A-D. Switch 12A can select an appropriate port 1-4 to route the incoming data using any solution (e.g., based on a destination address in the incoming data and a routing table). It is understood that while only outgoing data is shown for ports 1-4, switch 12A can receive incoming data via ports 1-4, which can be routed in a similar manner. Still further, while only a single destination node 18A-D is shown for each port 1-4, it is understood that multiple final destinations could be routed through a single port 1-4. For example, port 1 could be connected to another switch 12A, which includes any number of computer devices.

In any event, in a communications environment, each port 1-4 can comprise multiple class of service (COS) queues A-D. In this case, when the incoming data comprises packets, each packet can be placed on one of the COS queues A-D for the corresponding port 1-4. It is understood that while the discussion uses COS queues as an illustrative implementation, the teachings of the invention apply equally to quality of service (QoS) queues and any other group of queues for differentiating data for processing using any solution. Additionally, it is understood that while four ports 1-4 are shown and four COS queues A-D are shown for each port 1-4, any number of queues and/or ports may be included in a computer system 12 (FIG. 1).

Each COS queue A-D for a port 1-4 can be assigned a different priority. For example, queues A-D for port 1 could have descending priorities, with queue A having the highest priority, and queue D having the lowest priority. To this extent, incoming data that is routed to port 1 can be placed on one of the queues A-D based on its priority. Switch 12A can determine the priority for the incoming data using any solution. For example, the priority can be based on a source/destination address, the data content (e.g., real-time vs. background/batch), and/or the like. Further, a message (e.g., packet) header can specify a particular priority for the message.

For example, an Ethernet packet (e.g., frame) can include a virtual local area network (VLAN) tag. The VLAN tag includes a 3-bit COS field for designating a particular priority level. In this case, switch 12A can read the VLAN tag and direct the packet to the appropriate queue A-D. A 3-bit COS field enables the implementation of up to 8 priority levels. However, when a switch 12A supports fewer priority levels, switch 12A can automatically remark the priority level in COS field to one of the supported priority levels. For example, switch 12A could remark the 3-bit COS field to a two-bit value designating one of the four available COS queues A-D.

When transmitting outgoing data out a port, such as port 1, switch 12A can allocate bandwidth for each COS queue A-D based on its corresponding priority using any solution, e.g., a weighted time division multiplexing (TDM). In this case, a higher priority queue (e.g., COS queue A) can be allocated a larger portion of the bandwidth, thereby enabling data (e.g., packets) placed on the higher priority queue to be transmitted by switch 12A faster than the data placed on a lower priority queue. Further, switch 12A can enable a maximum/minimum transmission rate for each COS queue A-D for a port to be adjusted. For example, switch 12A may be capable of communicating at 1 Gigabits/second (Gps) out each port 1-4. However, destination node 18A may be simultaneously receiving data from multiple queues for different applications. In this case, destination node 18A can request that switch 12A "reshape" the transmission rates for one or more COS queues A-D to balance the streams for the corresponding applications. For example, destination node 18A may only desire data assigned to COS queue C at a lower communications rate, e.g., 10 Megabits/second (Mps). In this case, switch 12A can "rate shape" COS queue C for port 1 to have its maximum transmission rate set to 10 Mps.

Aspects of the invention provide a solution when one or more destination nodes 18A-D (e.g., a port thereon), which are receiving data from a port 1-4 has a lower transmission rate than the port 1-4. For example, port 1 may be capable of transmitting outgoing data at 1 Gbs, while destination node 18A is only capable of receiving incoming data at 100 Mbs. To this extent, FIG. 3 shows an illustrative data flow diagram for transmitting data over a network using computer system 12 (FIG. 1) according to an embodiment of the invention. Queue module 32 can manage transmission settings for a set of COS queues 40A-N for a particular port. To this extent, queue module 32 can manage a set of COS queue rates 42A-N corresponding to each COS queue 40A-N. In particular, queue module 32 can receive a request to limit a transmission rate for a particular COS queue 40A-N to a desired transmission rate. In response, queue module 32 can set a value for COS queue rate 42A-N for the COS queue 40A-N that limits the transmission rate as requested. It is understood that queue module 32 can limit the possible transmission rates to only a subset of all possible transmission rates. Further, it is understood that queue module 32 can map values in COS queue rates 42A-N to a corresponding transmission rate using any solution.

Additionally, queue module 32 can receive a request to limit the transmission rate for the port. To this extent, queue module 32 can further manage a limited data value 44, which indicates whether the transmission rate for the port is limited to a lower maximum transmission rate, or whether the port can transmit at its highest rate (subject to the combined rates for COS queue rates 42A-N, if limited, and an availability of data to transmit). Limited data value 44 can comprise a boolean true/false value and/or any similar value. Queue module 32 can receive requests to limit and/or remove a limit for the transmission rate of COS queue(s) 40A-N and/or the port using any solution. For example, queue module 32 can receive the requests from a message received by another computer system for processing by computer system 12 (FIG. 1), can manage a user interface and/or application program interface (API) that enables a user (individual or another system) to request implementation/removal of the limit(s), and/or the like. Further, computer system 12 can include one or more hardware switches that enable the transmission rate for a port to be selectively limited.

In any event, when the transmission rate for the port is not limited, direction module 34 receives incoming data packet(s) 50 and directs each data packet 50 to an appropriate COS queue 40A-N using any solution, as indicated by the dashed lines. For example, as described herein, an incoming data packet 50 may include a COS field 54 that designates a destination COS queue 40A-N. In this case, when data packet 50 does not include a COS field 54, direction module 34 can direct the data packet 50 to a default COS queue 40A-N and/or analyze the data packet 50 for placement on a particular COS queue 40A-N.

Similarly, when the transmission rate for the port is not limited, transmission module 36 will remove data packets 50 from COS queues 40A-N and transmit each data packet as an outgoing data packet 52 through the port. Transmission module 36 can remove data packets 50 from COS queues 40A-N according to a priority for each COS queue 40A-N, an amount of data on each COS queue 40A-N (e.g., number of packets, length of packets, and/or the like), and/or the like. Further, transmission module 36 can limit the removal of data packets from a particular COS queue 40A-N based on its corresponding COS queue rate 42A-N. In particular, if the transmission rate for COS queue 40A-N is limited, transmission module 36 can ensure that the data packets are not removed and transmitted from that COS queue 40A-N at a higher transmission rate than that specified by the corresponding COS queue rate 42A-N.

However, when the transmission rate for the port is limited (e.g., as indicated by limited data value 44), direction module 34 can direct all data, such as incoming packet(s) 50, to one of the plurality of COS queues, such as COS queue 40B as indicated by the solid line. Further, queue module 32 can set the COS queue rate 42B for the single COS queue 40B to the desired transmission rate for the port. In this case, transmission module 36 will only see packets on the single COS queue 40B and will limit their transmission as outgoing packets 52 through the port to the transmission rate designated by the corresponding COS queue rate 42B. As a result, the transmission rate for the entire port is effectively limited, e.g., to a transmission rate for a port on a destination node 18A (FIG. 2) that is receiving outgoing packets 52 from the port.

Direction module 34 can direct incoming packets 50 to the single COS queue 40B using any solution. For example, direction module 34 can alter a COS field 54 for an incoming packet 50 to designate the single COS queue 40B. Additionally, for an incoming packet 50 that does not include a COS field 54 (e.g., a VLAN tag that includes COS field 54), direction module 34 can automatically add COS field 54 (e.g., VLAN tag with COS field 54) to the incoming packet 50. In either case, each incoming packet 50 will be forwarded to the single COS queue 40B for transmission.

Additionally, while not shown, transmission module 36 can alter its functionality based on limited data value 44. For example, when limited data value 44 indicates that the transmission rate for the port is limited, transmission module 36 can initially clear any packets from the other COS queues, e.g., COS queues 40A, 40N, and subsequently only retrieve packets from COS queue 40B, without regard to any TDM algorithm, or the like, which is used to select a COS queue 40A-N during operation of the port when its transmission rate is not limited.

As a result, aspects of the invention provide a solution that enables network traffic to be reduced to accommodate for a port on a node having a slower transmission rate at the closest possible point to the source/transmitting node. In this manner, the network will have less time delay due to the retransmission of lost packets, fewer network nodes could become congested as a result of retransmissions, and congestions in the downstream nodes will be reduced. By limiting only a single port, nodes on a network can be upgraded in an incremental manner, a slower node can be temporarily utilized to replace a faster node, and/or the like. Further, the solution does not require functionality from multiple nodes, thereby requiring modification to multiple nodes in order to be successfully implemented.

While shown and described herein as a method and system for transmitting data over a network, it is understood that the invention further provides various alternative embodiments.

For example, in one embodiment, the invention provides a computer program stored on a computer-readable medium, which when executed, enables a computer system to transmit data over a network. To this extent, the computer-readable medium includes program code, such as switching program 30 (FIG. 1), which implements the process described herein. It is understood that the term "computer-readable medium" comprises one or more of any type of tangible medium of expression capable of embodying a copy of the program code (e.g., a physical embodiment). In particular, the computer-readable medium can comprise program code embodied on one or more portable storage articles of manufacture, on one or more data storage portions of a computing device, such as memory 22A (FIG. 1) and/or storage system 22B (FIG. 1), as a data signal traveling over a network (e.g., during a wired/wireless electronic distribution of the computer program), on paper (e.g., capable of being scanned and converted to electronic data), and/or the like.

In another embodiment, the invention provides a method of generating a system for transmitting data over a network. In this case, a computer system, such as computer system 12 (FIG. 1), can be obtained (e.g., created, maintained, having made available to, etc.) and one or more programs/systems for performing the process described herein can be obtained (e.g., created, purchased, used, modified, etc.) and deployed to the computer system. To this extent, the deployment can comprise one or more of: (1) installing program code on a computing device, such as computing device 14 (FIG. 1), from a computer-readable medium; (2) adding one or more computing devices to the computer system; and (3) incorporating and/or modifying one or more existing devices of the computer system, to enable the computer system to perform the process described herein.

In still another embodiment, the invention provides a business method that performs the process described herein on a subscription, advertising, and/or fee basis. That is, a service provider could offer to transmit data over a network as described herein. In this case, the service provider can manage (e.g., create, maintain, support, etc.) a computer system, such as computer system 12 (FIG. 1), that performs the process described herein for one or more customers. In return, the service provider can receive payment from the customer(s) under a subscription and/or fee agreement, receive payment from the sale of advertising to one or more third parties, and/or the like.

As used herein, it is understood that "program code" means any set of statements or instructions, in any language, code or notation, that cause a computing device having an information processing capability to perform a particular function either directly or after any combination of the following: (a) conversion to another language, code or notation; (b) reproduction in a different material form; and/or (c) decompression. To this extent, program code can be embodied as any combination of one or more types of computer programs, such as an application/software program, component software/a library of functions, an operating system, a basic I/O system/driver for a particular computing, storage and/or I/O device, and the like.

The foregoing description of various aspects of the invention has been presented for purposes of illustration and description. It is not intended to be exhaustive or to limit the invention to the precise form disclosed, and obviously, many modifications and variations are possible. Such modifications and variations that may be apparent to an individual in the art are included within the scope of the invention as defined by the accompanying claims.

What is claimed is:

1. A method of transmitting data over a network, the method comprising:
   limiting a transmission rate for a single one of a plurality of queues for a port,
   wherein the plurality of queues are implemented in parallel; and
   directing all data for transmission through the port to the single one of the plurality of queues,
   wherein the directing includes altering a class of service (COS) field in at least one data packet.

2. The method of claim 1, further comprising:
   receiving a plurality of data packets for transmission through the port; and
   transmitting the plurality of data packets through the port.

3. The method of claim 1, the limited transmission rate comprising a data transmission rate for a destination node for the data transmitted through the port.

4. The method of claim 1, the class of service field being included in a virtual local area network (VLAN) tag of the at least one data packet.

5. The method of claim 1, further comprising receiving a request to limit the transmission rate for the port, the limiting and directing being performed in response to the request.

6. A system for transmitting data over a network, the system comprising:
   a communications port;
   a system for limiting a transmission rate for a single one of a plurality of queues for the communications port,
   wherein the plurality of queues are implemented in parallel; and
   a system for directing all data for transmission through the communications port to the single one of the plurality of queues,
   wherein the system for directing includes a system for altering a class of service (COS) field in at least one data packet.

7. The system of claim 6, further comprising:
   a system for receiving a plurality of data packets for transmission through the communications port; and
   a system for transmitting the plurality of data packets through the communications port.

8. The system of claim 6, the limited transmission rate comprising a data transmission rate for a destination node for the data.

9. The system of claim 6, the class of service field being included in a virtual local area network (VLAN) tag of the at least one packet.

10. The system of claim 6, further comprising a destination node for receiving data transmitted through the communications port.

11. The system of claim 10, wherein the transmission rate for the single one of the plurality of queues is limited to a transmission rate for a port on the destination node.

12. The system of claim 6, further comprising a system for receiving a request to limit the transmission rate for the communications port.

13. A computer program comprising program code stored on a non-transitory computer-readable medium, which when executed, enables a computer system to implement a method of transmitting data over a network, the method comprising:
   limiting a transmission rate for a single one of a plurality of queues for a port,
   wherein the plurality of queues are implemented in parallel; and
   directing all data for transmission through the port to the single one of the plurality of queues, wherein the directing includes altering a class of service (COS) field in at least one data packet.

14. The computer program of claim 13, the method further comprising:

receiving a plurality of data packets for transmission through the port; and transmitting the plurality of data packets through the port.

15. The computer program of claim 13, the class of service field being included in a virtual local area network (VLAN) tag of the at least one data packet.

16. The computer program of claim 13, the method further comprising receiving a request to limit the transmission rate for the port, the limiting and directing being performed in response to the request.

17. A method of generating a system for transmitting data over a network, the method comprising:

providing a computer system operable to:

limit a transmission rate for a single one of a plurality of queues for a port, wherein the plurality of queues are implemented in parallel; and direct all data for transmission through the port to the single one of the plurality of queues, wherein the directing includes altering a class of service (COS) field in at least one data packet.

* * * * *